United States Patent
Font

[11] Patent Number: 5,957,043
[45] Date of Patent: Sep. 28, 1999

[54] FRUIT FEEDER FOR SQUEEZER MACHINES

[75] Inventor: Rafael Olmos Font, Valencia, Spain

[73] Assignee: Innovaciones Mecanicas, S.A., Valencia, Spain

[21] Appl. No.: 09/225,319

[22] Filed: Jan. 5, 1999

[30] Foreign Application Priority Data

Jan. 5, 1998 [ES] Spain ........................... 9800003

[51] Int. Cl.⁶ .................................................. A23N 1/00
[52] U.S. Cl. ........................... 99/502; 99/504; 99/507; 221/258; 221/290; 221/298
[58] Field of Search .................. 99/495, 501–508; 100/98 R, 213, 116, 127, 218; 198/443, 463.6, 704; 221/182, 251, 258, 279, 290, 296, 298; 414/223, 404, 417, 810

[56] References Cited

U.S. PATENT DOCUMENTS

| | | | |
|---|---|---|---|
| 1,888,528 | 11/1932 | Faulds | 99/504 |
| 1,888,529 | 11/1932 | Faulds | 99/504 |
| 2,065,271 | 12/1936 | Faulds | 99/504 |
| 2,270,007 | 1/1942 | McKinnis | 99/507 |
| 2,602,479 | 7/1952 | Trainor | 99/507 |
| 2,630,849 | 3/1953 | Williams | 99/502 |
| 2,707,981 | 5/1955 | Trainor | 99/507 |
| 2,975,810 | 6/1961 | Wurgaft | 100/98 R |
| 3,612,351 | 10/1971 | Voullaire | 221/298 X |
| 4,306,649 | 12/1981 | Berge | 221/298 X |
| 4,479,424 | 10/1984 | Carroll | 221/182 X |
| 4,974,505 | 12/1990 | Torrisi | 99/502 |
| 5,097,757 | 3/1992 | Antonio | 221/258 X |

*Primary Examiner*—Timothy F. Simone
*Attorney, Agent, or Firm*—Rothwell, Figg, Ernst & Kurz, P.C.

[57] ABSTRACT

A fruit feeder for vending machines includes a container for fruit storage, a fruit elevator and a horizontal fruit conveyor. The elevator is composed of two vertical endless chains between which are mounted horizontal vanes and which elevate and eject the fruit. The horizontal transporter is composed of two rollers turning in different directions and which have helical ribbings of opposite inclinations, receiving the fruit from the elevator to transport them to a collecting trough of the squeezer.

6 Claims, 4 Drawing Sheets

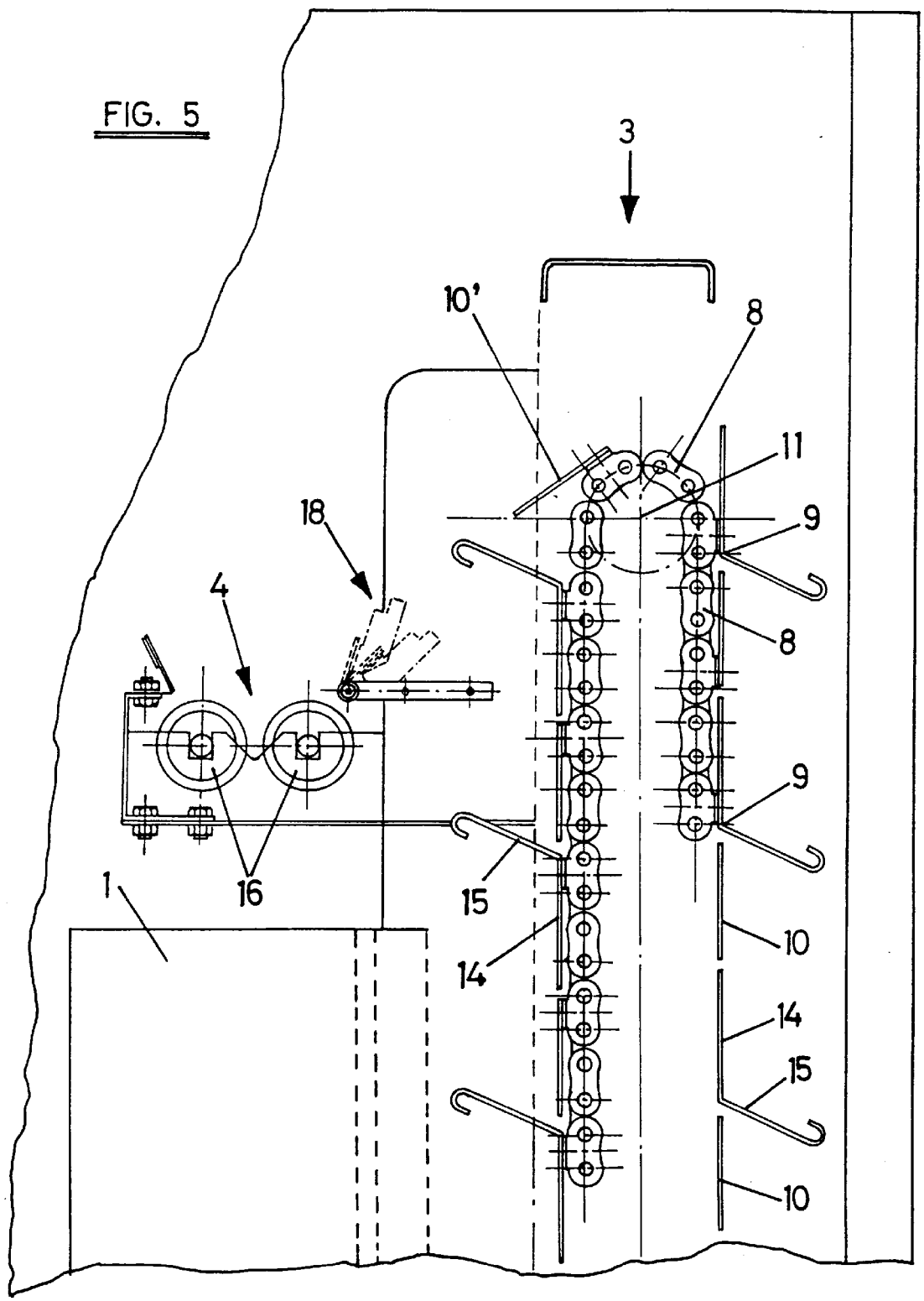

FRUIT FEEDER FOR SQUEEZER MACHINES

BACKGROUND OF THE INVENTION

1. Field of the Invention

The present invention refers to a fruit feeder for squeezer machines, built so that it ensures the feeding of the fruit to be squeezed from a fruit storage to the squeezing device.

2. Description of the Related Art

Fruit squeezing machines are generally conceived for manual control and include a small capacity fruit feeder, which may be limited to a feeding trough on which the fruit is manually placed as it is used.

SUMMARY OF THE INVENTION

An object of the present invention is to have a large capacity and automatic fruit feeder, so that it allows designing of automatic squeezing machines which may be controlled by, for example, introducing coins.

The feeder invented has a simple construction, thus ensuring correct operation and a reliable supply of fruit to the squeezing machine.

According to the invention, the fruit feeder for squeezer machines contains a fruit storage bin, a fruit elevator from the storage bin to a higher point located above the squeezing device and a horizontal fruit conveyor which runs from the aforementioned higher point to a fruit reception mouth or trough of the squeezing device.

The fruit elevator includes a vertical conveyor with horizontal vanes, whose upwards or downwards path follows one of the walls of the fruit bin, the vanes acting as scoops which pick up and carry the fruit upwards. This conveyor has, at the end of the advancing or lifting path, means by which the fruit is expelled from the vanes, after which they are received by the horizontal conveyor.

Said conveyor may be composed by two parallel endless vertical chains, with synchronized motion, alternately mounted between which are horizontal vanes with an angular profile acting as scoops to transport the fruit and horizontal flat vanes which act at the end of the advancing path to expel the fruit transported by the following angled vane.

As for the horizontal conveyor, it is composed by two parallel rollers placed near each other, rotating in opposite directions and which have helical ribbings of opposite inclinations, directed so that they carry the fruit from their exit from the elevator to their entry in the squeezing device.

The fruit feeder of the invention shall have means of detecting the absence of oranges in the horizontal roller conveyor, for example by employing photoelectric cells. This detection of the absence of fruit in the horizontal conveyor shall activate the fruit elevator which takes them from the storage bin and raises them until they fall on the horizontal conveyor. At this instant the photocell detects the presence of fruit and instructs the elevator to stop. The horizontal roller conveyor shall be activated at the same time as the squeezing device to guarantee the feeding of oranges to the machine, this process being repeated each time the absence of fruit in the horizontal conveyor is detected and each time the squeezing machine is turned on.

The rollers of the horizontal conveyor shall turn from the inside towards the outside, the helical ribs being set so that they push the oranges in the direction of motion. The oranges are left resting on the conveyor unharmed.

The fruit storage bin shall have a base tilted towards the elevating conveyor so ensuring that the squeezer receives every single orange contained in the bin, without jamming.

BRIEF DESCRIPTION OF THE DRAWINGS

The characteristics exposed as well as other characteristics of the invention are exposed below in greater detail with the aid of the attached drawings where an example of a non-limiting embodiment is shown. In the drawings:

FIG. 5 is a side elevation, similar to FIG. 3, which shows in a greater scale the upper part of the elevator and the horizontal conveyor.

DETAILED DESCRIPTION OF THE PREFERRED EMBODIMENTS

Figure 1:
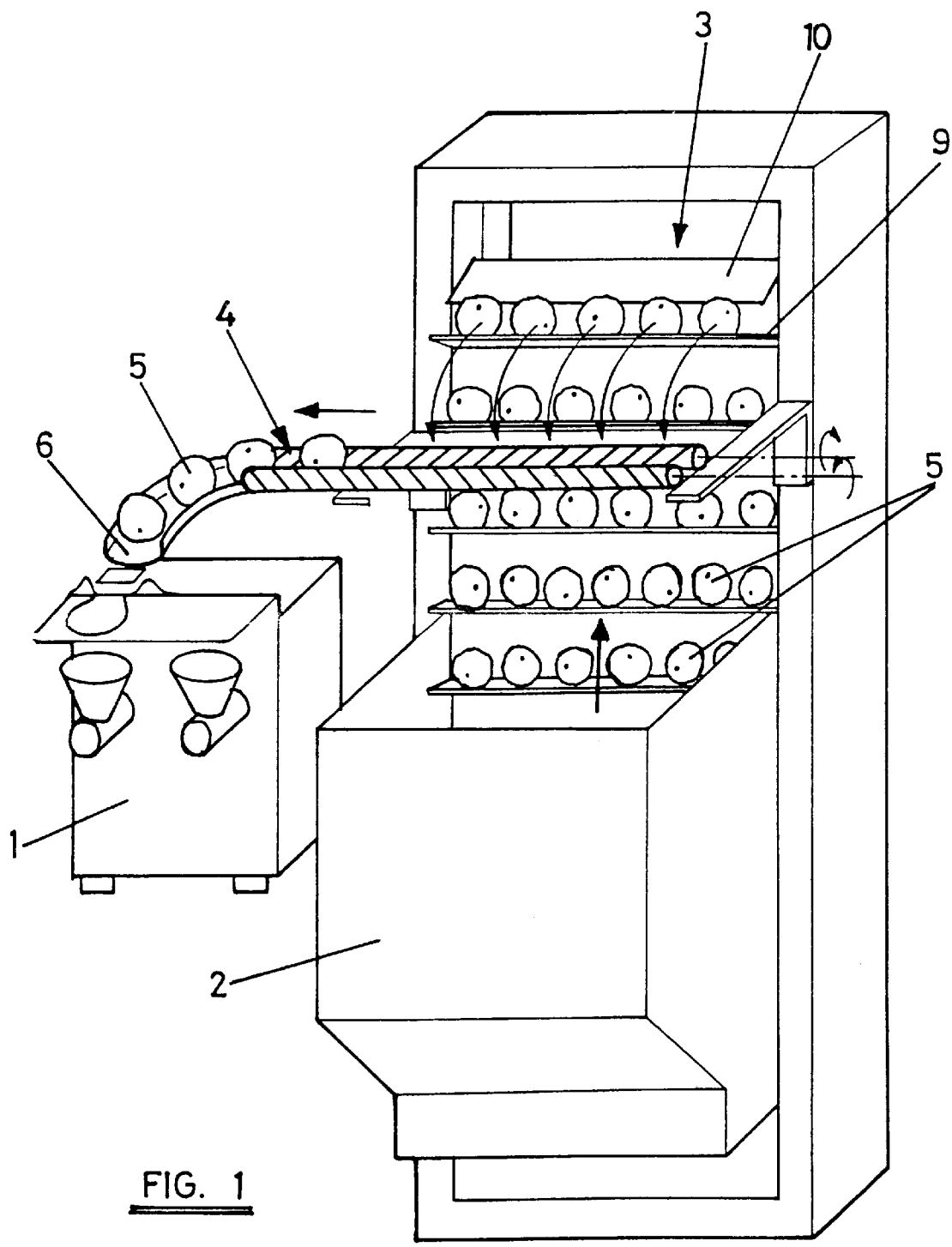
FIG. 1 is a schematic perspective of a squeezer machine with the fruit feeder of the invention.

The machine in FIG. 1 includes a fruit squeezing device 1, a fruit feeder composed by a fruit bin 2, a fruit elevator 3 and a horizontal conveyor labeled in general with the number 4.

The elevator 3 transports the fruits 5 upwards from the interior of bin 2 to a point located above the squeezer. When fruits 5 reach this higher point they are pushed down onto the horizontal conveyor 4 which receives them and transports them to a reception trough or mouth 6 for squeezer 1.

Figure 2:
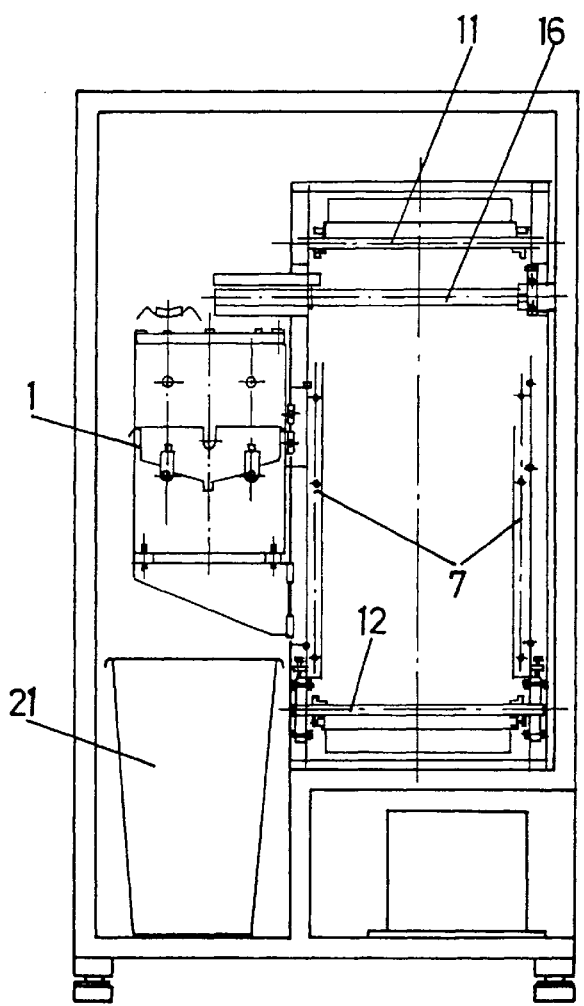
FIG. 2 is a front elevation of a squeezing machine with the feeder of the invention, without the front door.
Figure 3:
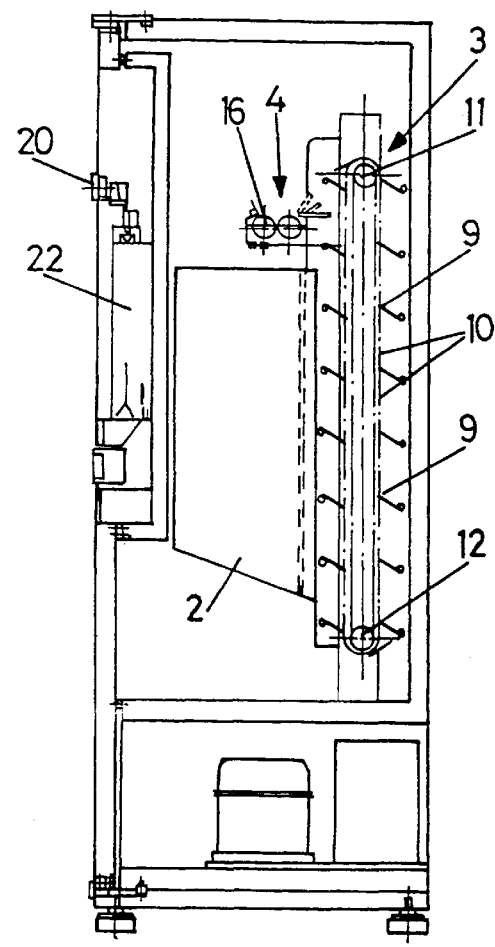
FIG. 3 is a right side elevation of the machine in FIG. 2 where the corresponding side wall has been removed.
Figure 4:
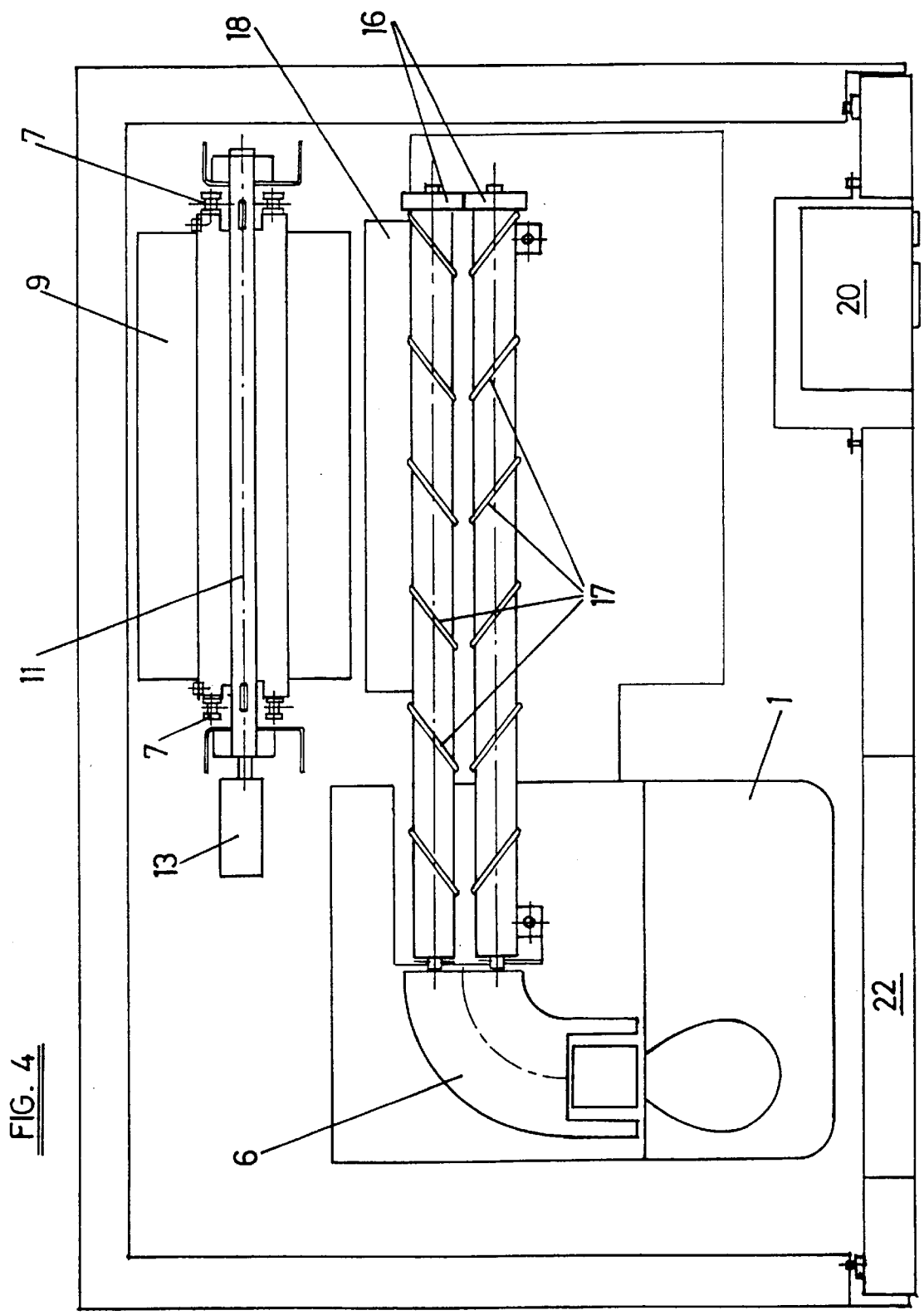
FIG. 4 is a top view of the machine in FIG. 2, at a greater scale and without the top of the same.

As is seen more clearly in FIGS. 2 to 4, the fruit elevator is made up of two vertical and parallel chains 7, their motions synchronized, made up of links 8, FIG. 5. Between chains 7 alternately mounted are angled horizontal vanes 9 and horizontal flat vanes 10. Each of these vanes is attached, as seen clearly in FIG. 5, to a single link of each chain.

The chains 7 are mounted on upper and lower reversing pinions connected to shafts 11 and 12, one of which, e.g. the upper one, is associated to a driving motor 13, FIG. 4.

As is better appreciated in FIG. 5, vanes 9 have an obtuse angled profile and are attached on one of their sides 14 to links 8 of the chains, while the other end projects outwards. With relation to the direction of motion of the chains the other end 14 of the vanes is directed backwards. Vanes 9 and 10 occupy alternating or correlative adjoining positions. Vanes 10 are attached to the corresponding link at points near the longitudinal edge of said vanes.

With the constitution discussed, along the forward and backward paths of the chains end 14 of vanes 9 runs parallel to the direction of motion of said chains, end 15 projecting out with an upwards tilt in the forward path of the chain and a downward tilt in the backward or downward path.

With this constitution, face 15 of the angled vanes acts as a scoop for elevating fruits from the storage bin 2.

As for flat vanes 10, they adopt a position parallel to the chain in its forward and backward path, while when direction changes they pivot as they are mounted on a single link, adopting in the upper part the position labeled 10', in which they shall push the fruit transported by the following angled vane, thus acting to eject the fruit which shall fall on horizontal conveyor 4.

The horizontal conveyor is composed of two horizontal and parallel cylinders 16 which turn in opposite directions, from the inside out, and have helical ribs 17 on their surface, FIG. 4, with opposite inclinations and directed so that during the rotation of the rollers they carry the fruit in the direction of the arrow in FIG. 4, from their reception from elevator 3 until they reach the trough or mouth 6 of the squeezer 1.

The rollers 16 are at a distance from the elevator 3 slightly greater than the width of face 1 of the angled vanes, so that the vanes are free to pass. Between the set of rollers 16 and the elevator 3, a hinged tray or ramp 18 may be placed on which the fruit arriving from elevator 3 may fall to roll until they fall between rollers 16.

The elevator shall have a photoelectric cell in charge of detecting the presence or absence of fruit on conveyor 4. If no fruits are detected, the elevator 3 shall be activated and once the fruits arrive on conveyor 4 and are detected by the photoelectric cell it shall be disactivated. The conveyor 4 shall begin to move at the same time as the squeezer 1, whose activation may be achieved by, for example, the introduction of coins in the machine for which it shall be provided with the corresponding selector 20.

The squeezing device shall have a set of showers, not shown, for its cleaning. Dirty water and peels may be collected in a lower container 21, FIG. 2.

The machine shall incorporate a cooling system to maintain fruit at the desired temperature. The selector 20 shall incorporate a traditional coin purse or a card one. It may also include a cup feeder 22 which shall take these from the storage point to the filling area and final removal by the customer.

As shown in FIGS. 1 and 3, the base of bin 1 is tilted downwards towards the elevator conveyor, in front of which is the forward or upward path of the elevator 3 for fruit collection.

While the preferred embodiments have been described above, it is to be understood that those skilled in the art can modify the invention according to circumstances at hand and that the present invention encompasses all variations within the scope of the appending claims.

What is claimed is:

1. A fruit feeder for squeezer machines, comprising:

a fruit storage bin;

a fruit elevator running from said storage bin to a high point above the squeezer;

a horizontal fruit conveyor running from the aforementioned high point to a mouth or trough receiving fruit from the squeezer;

said elevator is composed of two vertical and parallel endless chains with synchronized motions, between which are alternately mounted angular profiled horizontal vanes which act as scoops carrying the fruit, and flat horizontal vanes which at the end of the forward motion path eject the fruit transported by the angled vanes; and said horizontal conveyor has two parallel rollers placed next to each other, which turn in opposite directions and have a helical ribbing with opposite inclination directed so that they carry the fruit as the rollers turn, from their exit from the elevator to their entry in squeezer.

2. The feeder as in claim 1, wherein the angular profile vanes are mounted on the chains on one of their faces, directed backwards with respect to the forward motion, and fixed between two links, one of each chain, so that during forward and backward motion of the chains this end lies parallel to said motion, while the other end projects outwards, with a rising and declining inclination respectively, in the first case acting as fruit transporting scoops.

3. The feeder as in claim 1, wherein flat vanes are fixed between two links, one of each chain at points near the anterior longitudinal edge of said vanes, so that during the forward and backward motion of chain these vanes lie parallel to the motion and during change of direction they pivot so as to eject the fruit transported by the following angled vane.

4. The feeder as in claim 1, wherein the horizontal conveyor is placed near the end of the path of forward motion of the chain, parallel to the plane defined by said forward motion and separated from the same by a distance slightly greater than the width of the projecting face of the angled vanes to allow free passage for the fruit.

5. The feeder as in claim 4, wherein between the horizontal roller conveyor and the elevator a hinged tray is placed collecting fruits from the elevator and tilting them onto the conveyor.

6. The feeder as in claim 1, wherein the fruit storage bin is placed in front of the elevator and has a base which tilts downwards towards said elevator, ending in a mouth the elevation scoops enter, and not allowing the fruit to fall through said mouth.

* * * * *